United States Patent [19]

Jackman et al.

[11] 4,024,893

[45] May 24, 1977

[54] PIPE PROOF TEST FIXTURE

[75] Inventors: Robert M. Jackman; William N. McDonald, both of Little Rock, Ark.

[73] Assignee: A. O. Smith-Inland, Inc., Milwaukee, Wis.

[22] Filed: Jan. 21, 1976

[21] Appl. No.: 651,137

[52] U.S. Cl. .................................. 138/89; 220/237; 220/327

[51] Int. Cl.² ........................................ F16L 55/12

[58] Field of Search ................................ 138/89, 93; 220/235–237, 320, 321, 327, 328

[56] References Cited

UNITED STATES PATENTS

| | | | |
|---|---|---|---|
| 3,548,881 | 12/1970 | Pavan | 138/89 |
| 3,695,482 | 10/1972 | Smith | 220/328 |

FOREIGN PATENTS OR APPLICATIONS

| | | | |
|---|---|---|---|
| 660,382 | 2/1965 | Belgium | 220/327 |

*Primary Examiner*—Charles E. Phillips
*Attorney, Agent, or Firm*—Andrus, Sceales, Starke & Sawall

[57] ABSTRACT

An end closure for large diameter thin wall pipe employs separate opposed outside contractible and inside expansible assemblies to grip the pipe. A separate yoke member is carried by a closure member of the inside assembly and in turn carries means to actuate a seal between the closure member and the pipe. The external contractible member assembly has a sleeve-like clamp which extends longitudinally beyond the area of the internal expansible member and seal and confines the pipe beyond said areas.

10 Claims, 5 Drawing Figures

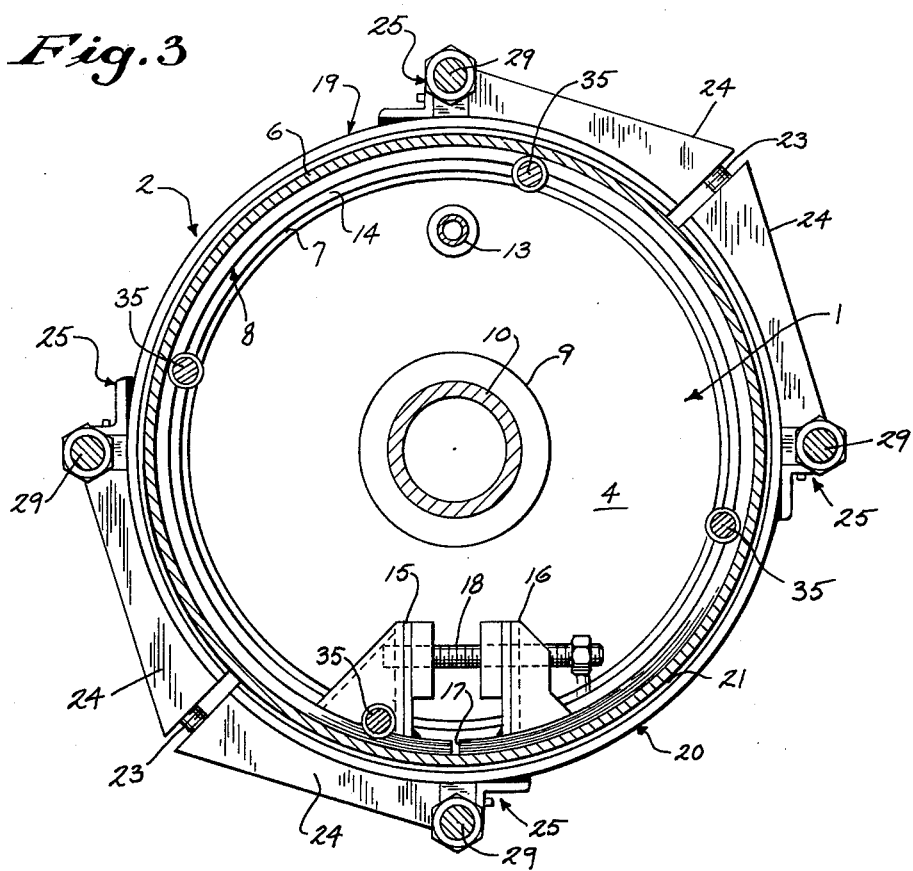
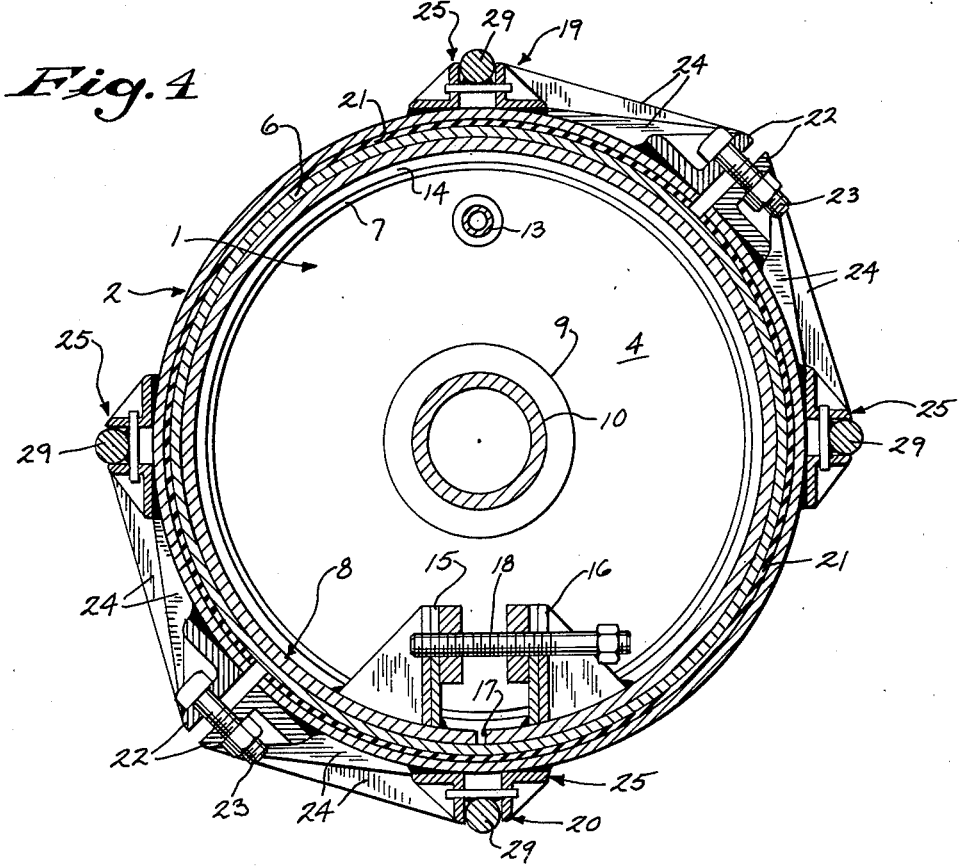

PIPE PROOF TEST FIXTURE

BACKGROUND OF THE INVENTION

This invention relates to a pipe proof test fixture generally employed to close the end of a pipe for preliminary testing of a pipe line before or after completion.

Problems arise in closing large diameter thin wall pipe made from synthetic plastics or glass fibers which may be more susceptible to disfigurations than metal pipes and which need greater protection against injury when sealing thereagainst.

It is generally essential to grip the pipe both externally and internally by members clamping the pipe wall radially therebetween, in order that a proper seal may be maintained.

Devices for this purpose have been proposed for metal pipe but are generally not adaptable for use with other pipes due to the mass weight of the device or to its tendency to either deform or disfigure the pipe.

Some devices are so heavy as to require mechanical assist in handling the same, making them cumbersome and slow in application.

Others depend upon deforming of the pipe end in securing the closure against test pressures.

These are particularly unsuitable for closing large diameter thin wall synthetic plastic or glass fiber pipes for proof testing up to two and one-half times the working pressure rating of the pipe.

SUMMARY OF THE INVENTION

The present invention provides a fixture made up of separate parts which are readily assembled and disassembled in applying the same to a pipe end and removing the same therefrom, respectively.

The fixture utilizes an external contractable clamping assembly comprising a relatively long semicylindrical sleeve-like clamp with a rubber-like liner contacting circumferentially on the outside of the pipe, and an internal expansible closure assembly comprising a deformable sealing ring internally of the pipe with mechanism for expanding the ring outward against the pipe in a region generally intermediate the ends of the outer sleeve, whereby there is a tendency for the clamp to maintain a tight frictional contact with the pipe to retain the fixture upon the end of the pipe.

A cylindrical stiffener is provided internally of the pipe wall to support it against external clamping pressures and serve as an abutment for the seal.

The closure provided is an end head slipped into the pipe ahead of the sealing ring and which is disposed to apply pressure against the ring tending to expand it outwardly in response to the fluid test pressures within the pipe.

The external and internal parts referred to are removably carried by a yoke which serves to transmit the gripping forces of the external sleeve to the internal closure members to retain the latter within the pipe against the forces exerted thereon by the internal fluid test pressures.

BRIEF DESCRIPTION OF THE DRAWING

The accompanying drawings illustrate the best mode presently contemplated for carrying out the invention.

In the drawings:

FIG. 3 is a transverse section of the assembly taken on line 3—3 of FIG. 1;

FIG. 4 is a transverse section of the assembly taken on line 4—4 of FIG. 1; and

DESCRIPTION OF THE PREFERRED EMBODIMENT

Figure 1:
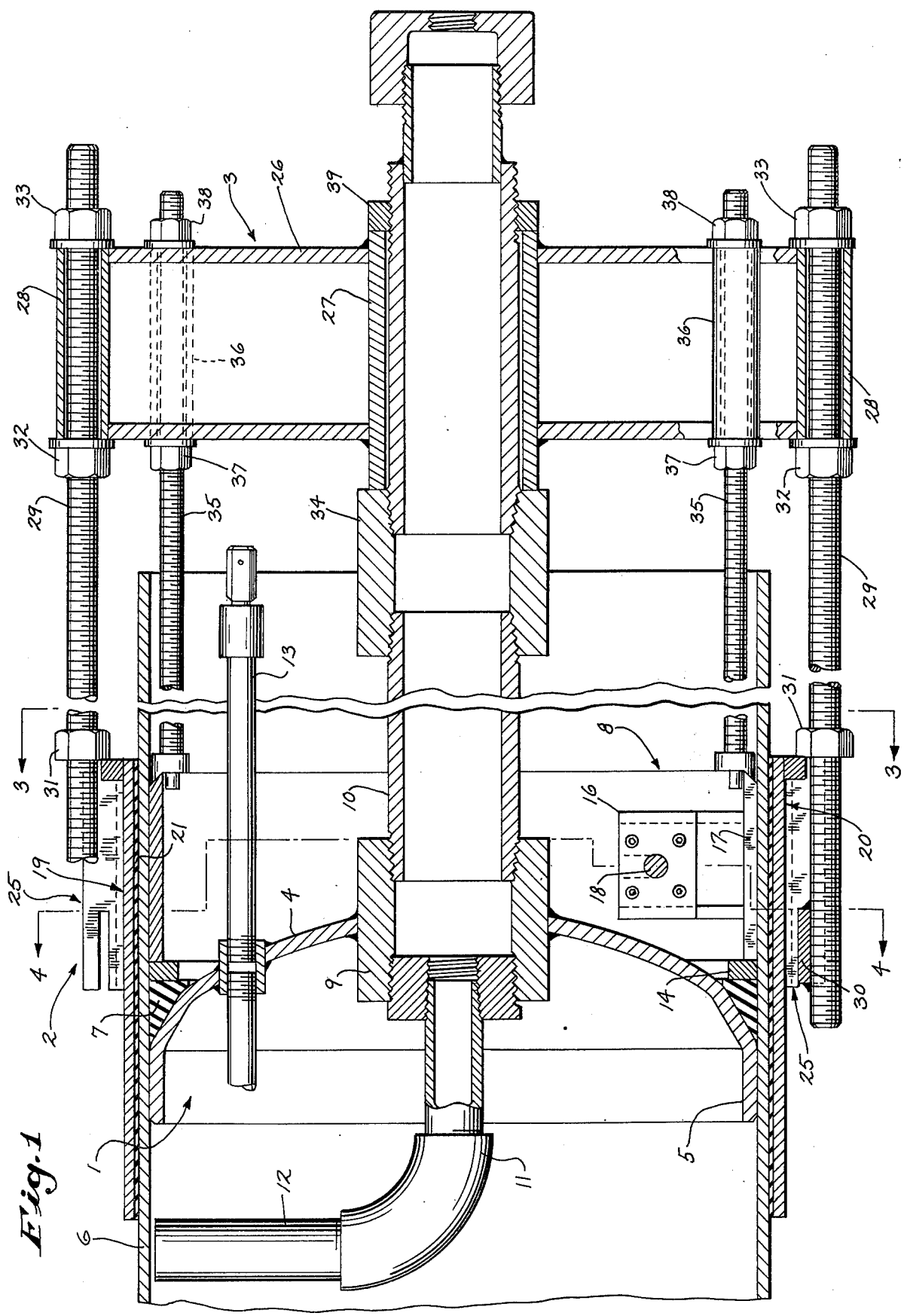
FIG. 1 is a section through the fixture after assembly upon an end portion of a pipe and taken axially of the pipe.
Figure 2:
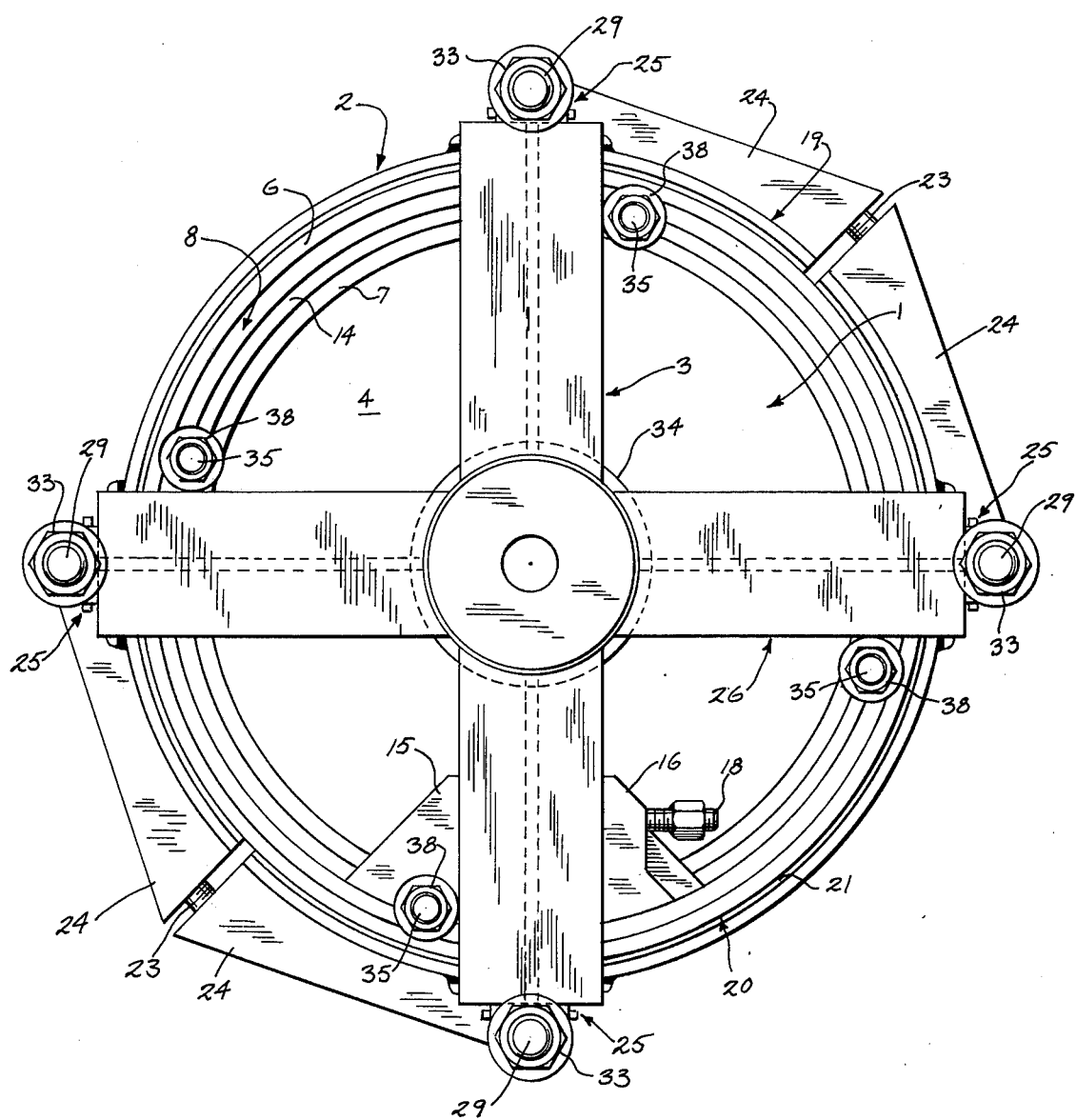
FIG. 2 is an end elevation of the assembly of FIG. 1.
Figure 5:
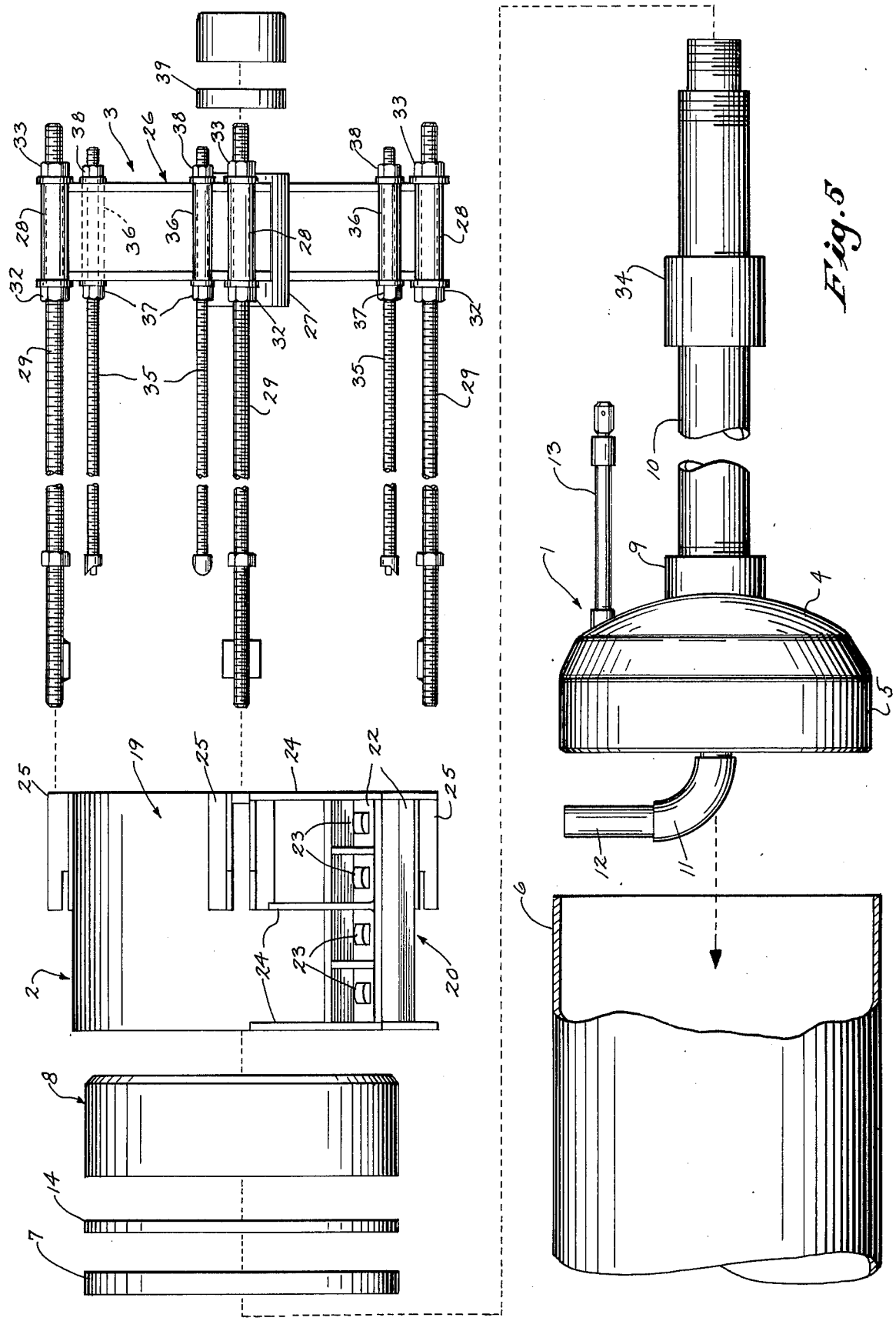
FIG. 5 is an exploded view of the parts of the fixture taken prior to assembly.

The preferred embodiment of the invention as illustrated in the drawings includes an inner closure assembly 1, an outer gripping assembly 2 and a cross-head connecting assembly or yoke 3.

The inner closure assembly 1 comprises a domed or dished head 4 having a skirt 5 of a diameter generally fitting loosely within the end of the pipe 6, an expansible sealing ring or gasket 7 extending circumferentially of the head at the knuckle and an expandable pipe wall stiffener 8 serving as a cylindrical stiffener abutment for the seal and an internal support for the pipe wall.

The dished head 4 has a central axial opening with an internally threaded coupling 9 welded therein for securing the fill pipe 10 thereto.

When the pipe 6 is filled at a different location the pipe 10 may serve as an air vent pipe, in which case an elbow 11 is threaded into the inner end of coupling 9 and a vertical radially extending tube 12 threaded onto the elbow to provide for air venting near the upper surface of the pipe.

When the pipe 10 is used for filling the pipe 6 with test pressure fluid elbow 11 and tube 12 are eliminated and an auxiliary air vent and pressure gauge tube 13 extends through the head 4 as shown.

The expansible sealing ring 7 is generally triangular in cross section and confined between the back of the head 4 which is angularly disposed adjacent the knuckle and a back-up ring 14 positioned against the inner end of the stiffener 8.

The expandable pipe wall stiffener 8 is a split ring of substantial length for supporting the wall of the pipe against possible collapse or distortion from the clamping pressure of assembly 2, and together with sealing ring 7 constitutes means to stabilize the wall of pipe 6 against collapse forces exerted by the external clamping assembly.

Normally the stiffener 8 could be cylindrical, but due to the general manufacturing tolerances for pipe 6 it is desirable to provide for an adjustment in diameter for stiffener 8 so that it will fit snugly in the pipe. For this purpose internal brackets 15 and 16 are secured to the stiffener 8 on opposite sides of the slit 17 therein, and a bolt 18 having oppositely threaded ends threaded into the respective brackets and extending across the slit serves to expand or contract the stiffener 8 within reasonable limits of adjustment.

The outer gripping assembly 2 comprises a long sleeve-like clamp made up of two semi-cylindrical clamp members 19 and 20 constituting a split collar and lined with rubber 21 or a rubber-like synthetic material to better grip the pipe frictionally and to prevent scratching or other damage to the outer surface of the pipe.

The clamp members 19 and 20 have brackets 22 secured thereto near their respective longitudinal edges, and bolts 23 secure the aligned brackets and serve to tighten the clamp members on to the pipe 6.

Stiffeners 24 may extend from brackets 22 circumferentially approximately 45 degrees to tie in with pull rod amount brackets 25 disposed 90 degrees apart around the circumference of the collar.

The connecting assembly 3 in the construction illustrated comprises a yoke 26 made up of a series of four radially extending I-beam arms having their inner ends secured to the outer surface of the sleeve or yoke tube 27 removably mounted on fill pipe 10, and having their outer ends provided with rod receiving yoke tubes 28 extending parallel to tube 27.

While the preferred embodiment has four arms in yoke 26 it is possible to employ only two arms or any number greater than two, in which case the length of stiffeners 24 and location of rod mounts 25 on clamp members 19 and 20 will be altered accordingly.

The tubes 28 are aligned with corresponding rod mount brackets 25 to receive the respective threaded pull rods 29 securing the yoke 26 to the outer gripping assembly 2.

The inner end of each rod 29 has a flat bar 30 disposed tangentially thereon and welded thereto, and which enters a complemental recess or slot in the corresponding rod mount bracket 25. The remainder of the rod is threaded and a nut 31 thereon engages the outer end of bracket 25 to secure the rod thereto. Adjustable means or nuts 32 and 33 on each rod 29 adjustably secures the same in the corresponding tube 28.

The yoke 26 generally supports the closure assembly 1 against axial movement in response to the pressure test fluid in the pipe. For this purpose a flange or thrust collar 34 on fill pipe 10, shown as a threaded coupling between two sections of the pipe, abuts against the inner end of tube 27 to hold the head 4 in adjusted position.

In addition extensible means comprising a thrust or push rod 35 carried by each arm yoke 26 bears against the outer end of stiffener 8 to hold it in place. Each thrust or push rod 35 extends through a support tube 36 welded to a corresponding arm of yoke 26, and is threaded to receive locating nuts 37 and 38 at opposite ends of the tube. A collar 39 is threaded on pipe 10 to secure tube 27 against flange 34.

By reason of the separate assemblies it is possible for one man to manually assemble the fixture upon a pipe end and to disassemble the same. Heretofore fixtures have generally been constructed with one or more pieces weighing several hundred pounds, requiring some form of hoist mechanism to position the parts.

The clamping of the pipe wall between outer clamp members 19 and 20 and inner stiffener 8 and skirt 5 tends to stabilize the dimensions of the pipe in the region of seal 7.

The fixture can be located in from the end of a pipe sufficiently to avoid interference with a belled or other coupling end.

In assembling a fixture upon a pipe end the operator first slips dished head 4 with fill tube assembly 10 and 34 thereon into pipe 6. Gasket 7 is lubricated and inserted followed by back up ring 14. Next stiffener 8 is inserted and pushed against back up ring 14. Then right and left hand threaded bolt 18 is turned to expand stiffener 8 tightly against the inner wall of pipe 6.

Split clamp collar members 19 and 20 are next placed around pipe 6 in the region of skirt 5, seal 7 and stiffener 8 and bolts 23 are firmly tightened causing liner 21 to compress and engage pipe 6 by friction over a large area.

Yoke 26 with thrust rods 35 loosely positioned in tubes 36 is then slipped over fill tube 10 and abutted against thrust collar 34 and threaded collar 39 is threaded onto fill tube 10 until yoke tube 27 is lightly snugged against thrust collar 34. Yoke 26 is then rotated until pull rod tubes 28 line up with pull rod collar mount brackets 25.

Next pull rods 29 with nuts 33 removed and nuts 31 and 32 loosened is inserted into yoke tube 28 from the rear and the flat bar 30 is engaged in the slot in pull rod mount bracket 25. Pull rod nuts 31 are tightened against brackets 25 to keep the rods 29 and bar 30 engaged.

Then pull rod nuts 32 are tightened sequentially and incrementally to force yoke 3 and dished head assembly 4 outwardly thereby uniformly compressing gasket 7 against the inner surface of pipe 6. The knuckle of head 4 and back-up ring 14 are retained by the friction of the tightly expanded stiffener 8 against pipe wall 6. Pull rod nuts 33 are then engaged and tightened against yoke tubes 28 to firmly rigidize the tubes, pull rods and collar assembly.

Next the abutment on the inner end of thrust rods 35 are engaged with the beveled surface of stiffener 8 and nuts 37 are tightened to override the friction of stiffener 8 against pipe 6 and further compressing gasket 7. The thrust rod nuts 38 are then tightened to retain the parts in position.

To the extent that movement of the dished head assembly 4 and/or of the back-up ring 14 effects expansion of sealing ring 7 against the inner surface of pipe 6, the assembly 4 and ring 14 constitute means to compress the sealing ring into engagement with the pipe wall.

The assembly is thereupon ready for service.

When the pipe 6 is tested by internal fluid pressure the force caused by the outward pressure on head 4 is transmitted through pipe 10 and rods 35 to yoke 26, and the tie rods 29 are tensioned to transmit the force back to the collar represented as clamps 19 and 20.

Utilizing the above described design and operating procedures a fixture was built and tested on 16 inch diameter glass fiber reinforced thermoset resin pipe having a wall thickness of 0.270 inch and an operating pressure rating of 100 psi. Pipe pressurized to 250 psi and held at pressure for one hour without leakage, slippage of the fixture or damage to the pipe. Total weight of all components was 245 lbs. with no single component weighing more than 90. Assembly onto the pipe was accomplished by one man and was ready for test in approximately 20 minutes.

Various modes of carrying out the plain invention are contemplated as being within the scope of the following claims particularly pointing out and distinctly claiming the subject matter which is regarded as the invention:

We claim:

1. A fixture for closing the end of a large diameter thin walled pipe, comprising an internal expansible closure assembly adapted to seal against the inner wall of the pipe, an external contractible clamping assembly adapted to be secured on the outside of the pipe in the region of said first named assembly, a separate yoke removably carried by said first named assembly, and adjusted means removably securing said yoke to said second assembly.

2. The fixture of claim 1 in which said closure assembly comprises a dished head having a skirt and knuckle at its outer circumference, a filler pipe carried axially by said head and having means for locating said yoke thereon, an expansible sealing ring adjacent the knuckle of said head, and means to compress said sealing ring against said head and into sealing engagement with the pipe wall.

3. The fixture of claim 2 in which said last named means comprises extensible means carried by said yoke.

4. The fixture of claim 1 in which said closure assembly comprises means to stabilize the wall of the pipe against collapse forces exerted by said external clamping assembly.

5. The fixture of claim 4 in which said last named means comprises a cylindrical stiffener support for the pipe wall.

6. The fixture of claim 5 in which said cylindrical stiffener is adjustable in diameter to snugly fit the inside of the pipe.

7. The fixture of claim 1 in which said clamping assembly comprises radially adjustable arcuate members adapted to be arranged circumferentially of the pipe to simulate a sleeve, and a resilient rubber-like liner for said sleeve.

8. The fixture of claim 7 in which said sleeve is of substantial length embracing and overlying said expansible closure assembly and a sealing ring for said internal assembly disposed to engage the wall of the pipe radially in a region intermediate the ends of said sleeve.

9. The fixture of claim 1 and a filler pipe extending axially from said closure assembly, and in which said yoke comprises a sleeve removably carried upon said filler pipe.

10. The fixture of claim 9 in which said yoke comprises a plurality of arms extending radially from said sleeve, and said means comprises a rod extending from the outer end of each arm to said clamping assembly.

* * * * *

UNITED STATES PATENT AND TRADEMARK OFFICE
CERTIFICATE OF CORRECTION

PATENT NO. : 4,024,893
DATED : May 24, 1977
INVENTOR(S) : ROBERT M. JACKMAN & WILLIAM N. McDONALD

It is certified that error appears in the above-identified patent and that said Letters Patent are hereby corrected as shown below:

Column 1, line 43, After "ring" insert ---radially---;

Column 3, line 3, Cancel "amount" and substitute therefor ---mount---;

Column 4, line 49, After "90" insert ---lbs.---;

Column 4, line 52, Before "invention" cancel "plain";

Column 4, line 57, Before "end" insert ---plain---;
CLAIM 1

Column 4, line 64, Cancel "adjusted" and substitute
CLAIM 1 therefor ---adjustable---;

Column 6, line 7, Cancel "overlying" and substitute

Signed and Sealed this

Eleventh Day of October 1977

[SEAL]

Attest:

RUTH C. MASON
*Attesting Officer*

LUTRELLE F. PARKER
*Acting Commissioner of Patents and Trademarks*